May 24, 1955
S. H. ZEEB
2,709,093
QUICK DISCONNECT PIPE COUPLING
Filed Dec. 10, 1951
2 Sheets-Sheet 1
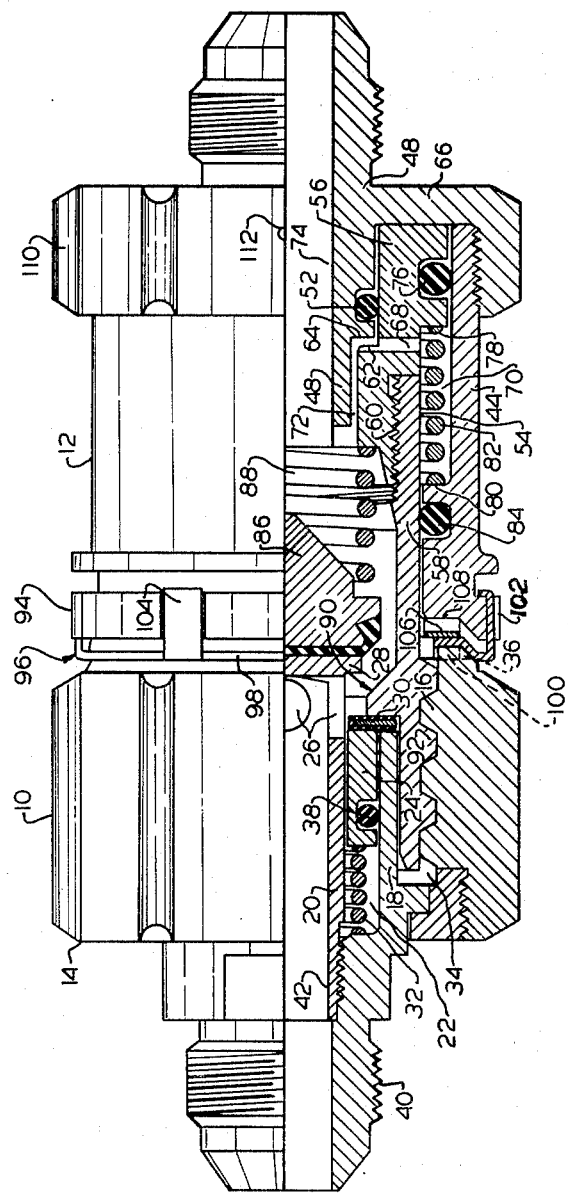
FIG. I
INVENTOR
STANLEY H. ZEEB
BY *Townsend & Beaman*
ATTORNEY May 24, 1955
S. H. ZEEB
2,709,093
QUICK DISCONNECT PIPE COUPLING
Filed Dec. 10, 1951
2 Sheets-Sheet 2
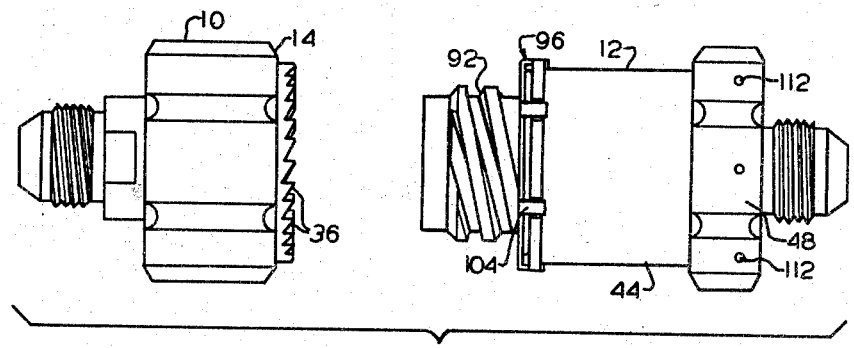
FIG. II
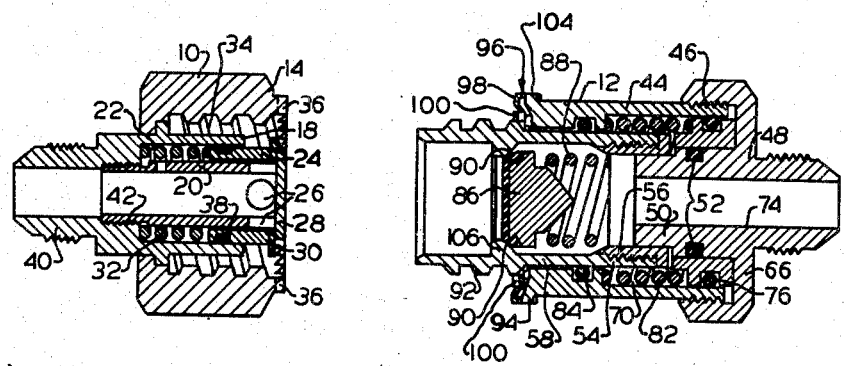
FIG. III
INVENTOR
STANLEY H. ZEEB
BY
ATTORNEY

United States Patent Office 2,709,093
Patented May 24, 1955

2,709,093

QUICK DISCONNECT PIPE COUPLING

Stanley H. Zeeb, Jackson, Mich., assignor to Aeroquip Corporation, Jackson, Mich., a corporation of Michigan Application December 10, 1951, Serial No. 260,852

1 Claim. (Cl. 285—120)

This invention relates to couplings for fluid conductors and more especially to improvements and modifications in the fluid coupling assembly disclosed in prior Patent No. 2,463,326.

The prior patent discloses a two part coupling assembly with each coupling part having a self-sealing valve and with provision for the two coupling parts being connected together, with the valves opened, in such manner that the connection can be broken automatically upon the occurrence of a predetermined pulling apart force exerted in the axial direction. The prior art patent also discloses one coupling part with an internal fluid compensating chamber in communication with the fluid flow passage defined in this coupling part and between which chamber and the said fluid flow passage fluid can flow in opposite directions upon elongation and contraction of the over-all length of the connected coupling parts in the connected and disconnected condition thereof and thereby maintain a constant fluid volume within the coupled fluid line.

It is an object of the present invention to provide a fluid compensated and automatic disconnect coupling assembly of the kind described in which a modified automatically acting disconnect coupling connection permits the over-all length of the assembled coupling to be maintained at a minimum.

It is a further object of the invention to provide a coupling assembly of the kind described having a simple yet effective automatic disconnect coupling connecting means.

The above and further objects and advantages of the invention, residing in the construction, arrangement and combination of parts will become clear and apparent from a consideration of the following description with reference to the accompanying drawings and from the appended claim.

In the drawings:

Fig. I is a half longitudinal section and half elevational view of a coupling assembly in accordance with the invention, showing the two coupling body parts in coupled relationship, in which their self closing valves are open, Fig. II is a side elevational view of the two coupling body parts, separated, and Fig. III shows the separated coupling body parts in longitudinal section.

In the drawings, 10 and 12 indicate, generally, the two tubular coupling body parts.

The body part 10 comprises an outer nut like part 14 having an interior steep pitch helical thread 16 and housing an inner concentric sleeve assembly 18, 20 defining an annular chamber 22 in which a sleeve valve member 24 is slidably mounted with respect to a series of valve ports 26 and a valve seat 28, the valve ports being at circumferentially spaced intervals around the end of the inner sleeve part 20 adjacent the valve seat 28, and the latter being in the form of an annular flange at this end of the sleeve part 20. The sleeve valve carries a valve packing ring 30 for engagement against the seat 28 through pressure applied by the coil spring 32 in the uncoupled condition of this coupling part. An annular space 34 is defined between the outer sleeve part 18 and the threaded interior of the outer part 14. Around its forward peripheral edge, as presented to the other coupling body part 12, the outer body part 14 is provided with a circular series of axially extending ratchet teeth 36. The sleeve valve is shown fitted with an O sealing ring 38.

The inner sleeve part 20 defines, with the outer nipple part 40, the fluid flow passageway 42 of this coupling body part.

The nipple part 40 serves for the attachment of this coupling body part to a fluid conductor line, usually in the form of flexible hose.

The other coupling body part 12 comprises an outer cylindrical part 44, to the outer end of which there is secured, as by screw-threading 46, a union nipple part 48, which part 48 has an inner sleeve part 50 which extends in concentric spaced relationship within the cylinder 44 and carries an O sealing ring 52 on its outer surface presented to the interior surface of a composite interior plunger sleeve, indicated generally at 54.

The plunger sleeve is composed of two sleeve sections 56, 58 secured together in axial extension by the screw-threading 60, with the section 56 presenting an inwardly directed radial step 62 to an outwardly directed radial step 64 on the relatively fixed union part 48. The section 56 when engaged against the outer radial wall 66, as seen in Fig. I, presents a radial channel 68 therein, both to an outer annular chamber 70, defined between the cylinder part 44 and the plunger 54, and to an inner annular chamber 72, defined between the plunger section 56 and the sleeve extension 48. One, or a series, of radial channels 68 may be provided opening into the chambers 70 and 72. The chamber 72 opens to the fluid flow passage 74 of this coupling body part 12. This arrangement of the channel (or channels) 68 and chambers 70 and 72 is constantly open to the fluid in the flow passage 74, and forms a fluid compensating system within the coupling permitting the fluid to pass back and forth with respect to the fluid flow passage 74 and the outer chamber 70 as the coupling body parts 10 and 12 are contracted axially upon one another, when connecting the parts together, or are subjected to over-all elongation, upon automatic disconnection, as will be described and made clear later.

The plunger section 56 is formed at its outer end with an enlarged portion carrying an O sealing ring 76 and defining an outwardly directed radial wall 78, between which wall and an inwardly directed radial wall 80 on the cylinder part 44 a coil spring 82 is confined within the fluid compensating chamber 70. This spring operates constantly to urge the plunger 54 to the contracted position within the cylinder part 44 as seen in Fig. I. The O ring 76 seals one end of the chamber 70. The opposite end is sealed by the O ring 84 mounted upon the interior of the cylinder part 44.

The coupling body part 12 includes a self-sealing valve, indicated at 86. This valve is mounted by the coil spring 88 to have fluid sealing engagement with the annular valve seat 90 defined within the plunger part 58.

The plunger part 58 is formed to telescope in the annular space 34 of the other coupling body part 10 and is provided with external helical threading 92 for engagement with the internal helical threading 16 of the coupling body part 10.

At its forward end, as presented to the ratchet teeth 36 on the other coupling body part 10, the coupling body part 12 is shown formed with an exterior flange 94 over which there is fitted a spring mounted tongued ring assembly, indicated generally at 96, and provided for cooperation with the ratchet teeth 36 to form a connection between the two coupling body parts which is capable of disconnecting automatically upon the coupled body parts 10, 12 being subjected to a predetermined axially applied pulling apart force. This tongued ring assembly 96 comprises an annular sheet metal ring member 98 having a circular series of axially directed flexible tongues 100 stamped out from the metal of the ring and positioned for presenting to the axial ratchet teeth 36 by the ring being clamped upon the flange 94 by the engagement in circumferentially spaced peripheral and axial slots 102 on the flange of claw formed axial tongues 104 on the ring member 98. A spring ring 106 of wave formation is mounted between the ratchet ring 98 and the radial end wall 108 of the cylinder part 44. This spring ring operates constantly to urge the ratchet ring 100 outwardly but permits the ring 100 to flex relatively to the cylinder part 44 upon connection of the coupling body parts and thereby permit the flexible tongues 100 to adjust themselves into engagement with the ratchet teeth 36.

The outer nut-like end 110 of the cylinder part 44 is provided with one or more radial ports 112, the purpose of which is to open to the external atmosphere the enclosed space which is opened up between the part 56 and the wall 66 when the plunger 54 is moved relatively to the part 44 in the connection and disconnection of the coupling body parts. This port 112 (or ports) form, in effect, air bleed ports.

To couple the body parts 10 and 12 together it is merely necessary to engage the externally steep pitch helical thread 92 on the projecting plunger part 58 of the coupling body part 12 with the internal helical thread 16 on the other coupling body part 10. With these threaded parts thus engaged and with the one body part grasped in one hand while the other body part is turned clockwise the coupling body parts will be brought quickly together to the position where the flexible tongues 100 snap into engagement with the rigid ratchet teeth 36. At the same time the valves 24 and 86 will be forced to open position against the action of their springs 32 and 88, respectively, through the mutual engagement of the valve seat 28 with the exposed end wall of the valve 86 and of the internal annular flange 106 (containing the valve seat 90) with the packing ring 30 of the valve sleeve 24. With the ratchet teeth 36 and the tongues 100 fully engaged the coupling body parts are held coupled together with their valves open and with the tensioned springs 32 and 88 exerting pressure against the engaged helical threads in resisting relation to the screwed-up condition of the parts, which, however, is prevented from re-acting to unscrew the parts due to the pressure engagement of the axial edges of the ratchet teeth 36 against the flexible tongues 100. With these teeth and tongues so engaged further relative rotary movement of the coupling body parts is not possible and the parts are held firmly coupled together. The construction and arrangement is such, however, that the coupled condition can be automatically broken upon the coupled coupling parts being subjected to sufficient axially applied pulling apart force as to bring the ratchet teeth 36 and tongues 100 out of engagement with each other as the result of the axial separation of the coupling body parts a distance equivalent to the axial extent of the engaged ratchet teeth and tongues and this against the action of the coil spring 82. In this connection, it will be observed that the plunger 54, coupled to the opposed body part 14, is capable of being pulled out relatively to the cylinder part 44 upon the occurrence of such pulling apart force, compressing the coil spring 82 and causing fluid to be displaced from the outer chamber 70 into the fluid flow passage 74 via the radial port (or ports) 68 and the inner chamber 72. Such fluid transfer provides compensation for the increase in the overall length of the coupled body parts which takes place prior to disengagement of the ratchet teeth 36 and the flexible tongues 100 and thereby maintains a constant fluid volume within the coupling, the reverse flow action taking place when the plunger is restored to its original retracted position by the action of the spring 82 on the separation of the coupling body parts. This resembles a kind of fluid pumping action within the coupling body part and is attendant with a bleeding of air through the port (or ports) 112 with respect to the air space opened up between the wall 66 and the adjacent plunger end as the plunger is pulled outwards. The automatic disconnection of the coupling parts results from the axially directed force applied to the plunger 58 by the compression of the spring 82 when this plunger is moved relatively to the cylinder part 44 to disengage the ratchet teeth and tongues 100. Thus, when this dis-engagement takes place the spring 82 automatically restores the plunger to its original position. In so doing, rotary motion will be imparted to the nut 10 by engagement of its threads 16 with the plunger threads 92, so that the coupling parts become disconnected.

Upon the ratchet teeth 36 and tongues 100 being brought together the flexible mounting of the ring 98 containing the tongues 100 permits relative movement to take place between the ring 98 and its coupling body part 12, to such extent as may be necessary to position the tongues for proper engagement with the ratchet teeth 36. Such engagement is possible without affecting the fluid displacement system, such as would occur if the coupling part 12 had ratchet teeth rigid therewith as in the case of the coupling body part 10 and adapted for engagement with the ratchet teeth 36.

Having thus described the invention in one practical form, but without limitation to the precise details of construction thereby involved, what I claim as novel and wish to secure by Letters Patent is as follows:

In an automatically disconnectable pipe coupling, a pair of hollow body parts, one said part carrying a rotatable coupling nut and the other said body comprising an outer part and an inner hollow plunger axially slidable and rotatable with respect to said outer part, said outer part and said plunger defining an annular space between them in communication with the plunger interior, said plunger having an end portion projecting beyond the corresponding end of said outer part, said nut having multiple internal quick-action helical threading engageable with corresponding helical threading on said projecting plunger end portion, axially extending lock means on said outer part engageable by axial teeth on said nut, upon tightening rotation of said nut in one direction of rotation, to hold the said pair of hollow body parts connected, a compression coil spring in said annular space acting at one end against said plunger and at its opposite end against said outer part so that said coil spring is compressed when an external axially applied pulling apart force applied to said body parts moves the said lock means out of engagement, whereby the energy stored in said spring is transmitted to said quick-action threads on said plunger to cause relative rotation between said nut and plunger end portion to automatically disengage the body parts at the instant the said lock means are disengaged.

References Cited in the file of this patent

UNITED STATES PATENTS

| | | |
|---|---|---|
| 1,080,674 | Berg | Dec. 9, 1913 |
| 1,580,694 | Smith | Apr. 13, 1926 |
| 1,871,370 | Jacques | Aug. 9, 1932 |
| 2,076,918 | Robinson | Apr. 13, 1937 |
| 2,204,392 | Arm | June 11, 1940 |
| 2,436,206 | Deming | Feb. 17, 1948 |
| 2,441,363 | Krueger | May 11, 1948 |
| 2,463,326 | Smisko et al. | Mar. 1, 1949 |
| 2,489,919 | Merriman | Nov. 29, 1949 |
| 2,498,104 | Brandau | Feb. 21, 1950 |
| 2,505,245 | Hollerith | Apr. 25, 1950 |
| 2,509,444 | Mitchell | May 30, 1950 |